(12) United States Patent
Edsall et al.

(10) Patent No.: US 10,021,007 B2
(45) Date of Patent: **\*Jul. 10, 2018**

(54) MEASURING LATENCY WITHIN A NETWORKING DEVICE

(71) Applicant: Cisco Technology, Inc., San Jose, CA (US)

(72) Inventors: Thomas J. Edsall, Los Gatos, CA (US); Wei-Jen Huang, Burlingame, CA (US); Chih-Tsung Huang, Burlingame, CA (US); Kelvin Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,594

(22) Filed: Sep. 8, 2016

(65) Prior Publication Data
US 2016/0380859 A1    Dec. 29, 2016

Related U.S. Application Data

(63) Continuation of application No. 14/723,748, filed on May 28, 2015, now Pat. No. 9,515,900, which is a continuation of application No. 13/708,305, filed on Dec. 7, 2012, now Pat. No. 9,094,307.

(60) Provisional application No. 61/702,322, filed on Sep. 18, 2012.

(51) Int. Cl.
*H04L 12/26* (2006.01)
*H04L 12/28* (2006.01)
*G06F 3/00* (2006.01)

(52) U.S. Cl.
CPC ........ *H04L 43/0858* (2013.01); *H04L 43/028* (2013.01); *H04L 43/062* (2013.01); *H04L 43/106* (2013.01)

(58) Field of Classification Search
CPC . H04L 43/0858; H04L 43/028; H04L 43/106; H04L 43/062
See application file for complete search history.

(56) References Cited

U.S. PATENT DOCUMENTS

| | | |
|---|---|---|
| 6,246,684 B1 | 6/2001 | Chapman et al. |
| 6,697,365 B1 | 2/2004 | Messenger |
| 6,717,917 B1 | 4/2004 | Weissberger et al. |
| 6,892,237 B1 | 5/2005 | Gai et al. |
| 6,990,202 B2 | 1/2006 | Wee et al. |
| 7,106,731 B1 | 9/2006 | Lin et al. |
| 7,395,332 B2 | 7/2008 | Gai et al. |
| 7,474,666 B2 | 1/2009 | Kloth et al. |

(Continued)

*Primary Examiner* — Kiet Tang
(74) *Attorney, Agent, or Firm* — Edell, Shapiro & Finnan, LLC (57) ABSTRACT

Presented herein are techniques to measure latency associated with packets that are processed within a network device. A packet is received at a component of a network device comprising one or more components. A timestamp representing a time of arrival of the packet at a first point in the network device is associated with the packet. The timestamp is generated with respect to a clock of the network device. A latency value for the packet is computed based on at least one of the timestamp and current time of arrival at a second point in the network device. One or more latency statistics are updated based on the latency value.

20 Claims, 5 Drawing Sheets

(56) References Cited

U.S. PATENT DOCUMENTS

| | | |
|---|---|---|
| 7,656,818 B1 | 2/2010 | Baroudi et al. |
| 7,830,793 B2 | 11/2010 | Gai et al. |
| 7,899,048 B1 | 3/2011 | Walker et al. |
| 7,961,621 B2 | 6/2011 | Bergamasco et al. |
| 7,969,971 B2 | 6/2011 | Gai et al. |
| 8,208,389 B2 | 6/2012 | Alaria et al. |
| 8,640,036 B2 | 1/2014 | Pignataro et al. |
| 9,094,307 B1 | 7/2015 | Edsall et al. |
| 2003/0231596 A1 | 12/2003 | Hong |
| 2006/0062209 A1 | 3/2006 | Riley |
| 2006/0253900 A1 | 11/2006 | Paddon et al. |
| 2006/0268847 A1 | 11/2006 | Halbraich et al. |
| 2009/0034416 A1 | 2/2009 | Baron et al. |
| 2009/0041011 A1 | 2/2009 | Sheppard |
| 2009/0100040 A1 | 4/2009 | Sheppard et al. |
| 2009/0122805 A1* | 5/2009 | Epps ................... H04L 41/5009 370/417 |
| 2009/0171474 A1 | 7/2009 | Birze et al. |
| 2010/0030999 A1 | 2/2010 | Hinz |
| 2010/0054152 A1 | 3/2010 | Foschiano et al. |
| 2010/0154033 A1 | 6/2010 | Oulai |
| 2010/0211702 A1* | 8/2010 | Klapproth ............. G06F 1/3203 710/18 |
| 2012/0008513 A1 | 1/2012 | Baek et al. |
| 2012/0051234 A1* | 3/2012 | Gintis ................. H04L 12/2697 370/250 |
| 2012/0106365 A1* | 5/2012 | Terry ................. H04L 43/0852 370/252 |
| 2013/0188509 A1* | 7/2013 | Mellein .............. H04B 17/0085 370/252 |
| 2015/0263922 A1 | 9/2015 | Edsall et al. |

* cited by examiner

MEASURING LATENCY WITHIN A NETWORKING DEVICE

RELATED APPLICATIONS

This application is a continuation of U.S. application Ser. No. 14/723,748, filed May 28, 2015, which in turn is a continuation of U.S. application Ser. No. 13/708,305, filed Dec. 7, 2012, now U.S. Pat. No. 9,094,307, which in turn claims priority to U.S. Provisional Application No. 61/702,322, filed Sep. 18, 2012, entitled "Measuring Latency Within a Networking Device", the contents of each of which are incorporated in their entirety herein by reference.

TECHNICAL FIELD

The present disclosure relates generally to measuring latency in a networking device.

BACKGROUND

In a computer network environment, such as a data center, data is transmitted from a source to a destination in the form of packets that generally pass through one or more network devices (e.g., switches, routers, firewalls, etc.). Certain data center customers demand network architectures that can provide low latency, high bandwidth, and often massive scalability. However, measuring latency may be difficult and time sensitive applications often do not have the proper visibility into time for packets to reach a certain destination and when packets were actually sourced at specific locations in the network.

DESCRIPTION OF EXAMPLE EMBODIMENTS

Overview

Presented herein are techniques to measure latency associated with packets that are processed within a network device. A packet is received at a component of a network device. A timestamp representing a time of arrival of the packet at a first point in the network device is associated with the packet. The timestamp is generated with respect to a clock of the network device. A latency value for the packet is computed based on at least one of the timestamp and a current time of arrival at a second point in the network device. One or more latency statistics are updated based on the latency value.

Example Embodiments

An ultra-low latency (ULL) network is a particular type of computing network used, for example, by High Frequency Trading (HFT) customers to trade financial assets. Measuring latency is extremely important in such environments because, in such applications, even slight delays in transmission time may have financial repercussions. In particular, having a faster data connection than a competitor may enable an HFT customer to increase order flow, liquidity, accelerate price discovery and capture opportunities during periods of volatility to gain a competitive advantage.

Conventional latency measurement solutions are external to the network devices (e.g., routers or switches). Presented herein are techniques to measure, aggregate and export latency information in a network device.

Figure 1:
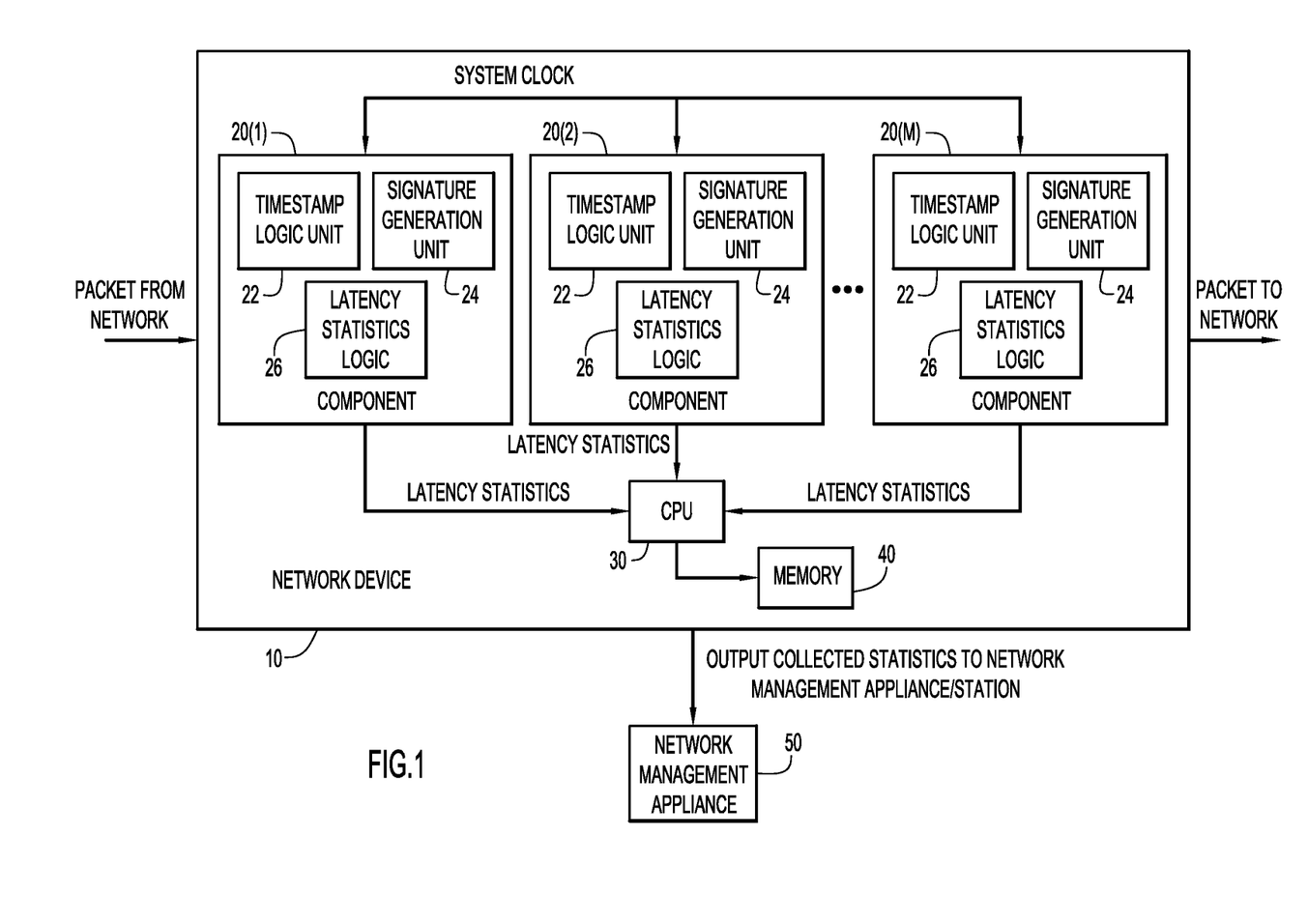
FIG. 1 is a block diagram of a network device configured to make latency measurements on packets as they traverse through components of the network device.

Referring first to FIG. 1, an example block diagram is shown of a network device 10. The network device 10 comprises a plurality of components 20(1)-20(M), a central processing unit (CPU) 30 and memory 40. The components 20(1)-20(M) are synchronized to a system clock of the network device. That is, the system clock is common to all components in the network device 10, but the source of the system clock may derived from a network-wide (global) synchronized clock, e.g., in accordance with the IEEE 1588 Precision Time Protocol (PTP) or other methods now known or hereinafter developed. The network device 10 can be any network device now known or hereinafter developed, including a switch, router, gateway, a software stack on a host device, virtual network interface cards (VNICs) virtual switches, physical network interface cards (including those that support virtualization).

The components 20(1)-20(M) of the network device 10 perform various functions depending on the network device. For example, the components 20(1)-20(M) may include ports of the network device at which inbound packets from a network are received and from which outbound packets to the network are sent. Other examples of components include a switch fabric that is commonly embodied as an application specific integrated circuit and includes digital logic blocks for switching tables, buffers, queues, etc. It is to be understood that the components 20(1)-20(M) shown in FIG. 1 can take the form of any of these or other components in a network device. Each component 20(1)-20(M) generates latency statistics with respect to packets that traverse through it, and sends these latency statistics to the CPU 30. The CPU 30 may store the latency statistics in memory 40, and on a periodic or on-demand basis sends the latency statistics to a network management appliance/station 50. The network management appliance 50 may send commands/instructions to the network device 10 to retrieve reports for latency statistics for the network device.

As shown in FIG. 1, each component that is to report latency statistics to the CPU 30 includes a timestamp logic unit 22, a signature generation unit 24 and latency statistics logic 26. The timestamp logic unit 22 generates a timestamp, relative to the system clock, upon entry of a packet into the component. The signature generation unit 24 generates a signature based on one or more flow parameters of the packet. The signature is used as a key to track that packet as it moves through components of the network device for purposes of measuring latency in the network device. A timestamp (TS) and signature (SIG) are inserted into (in-band) or otherwise associated with the packet (out-of-band) in order to allow for measurement computations as the packet moves through the individual components of the network device 10. The latency statistics logic 26 makes latency measurement of packets and computes one or more latency statistics based on the latency measurements, and outputs the latency statistics to the CPU 30. The reporting to the CPU 30 from the components may be on a polled-basis by the CPU 30 or a pushed-basis from the components to the CPU 30. Further details of the latency statistic logic 26 are presented hereinafter in connection with FIG. 3. Thus, the CPU 30 of the network device will receive latency statistics reports from each component of the network device, and will therefore have information as to the overall latency associated with the network device at any given time based on the latency measurements received over time from the components of the network device.

Memory 40 may comprise read only memory (ROM), random access memory (RAM), magnetic disk storage media devices, optical storage media devices, flash memory devices, electrical, optical, or other physical/tangible memory storage devices. The CPU 30 is, for example, a microprocessor or microcontroller. Thus, in general, the memory 40 may comprise one or more tangible (non-transitory) computer readable storage media (e.g., a memory device) encoded with software comprising computer executable instructions and when the software is executed (by the CPU 30) it is operable to perform the operations described herein.

The timestamp logic unit 22, signature generation unit 24 and latency statistics logic 26 may be embodied by digital logic gates that are integrated into one or more application specific integrated circuits. Alternatively, the functions of these blocks may be embodied by software instructions stored in memory 40 and executed by CPU 30.

Figure 2:
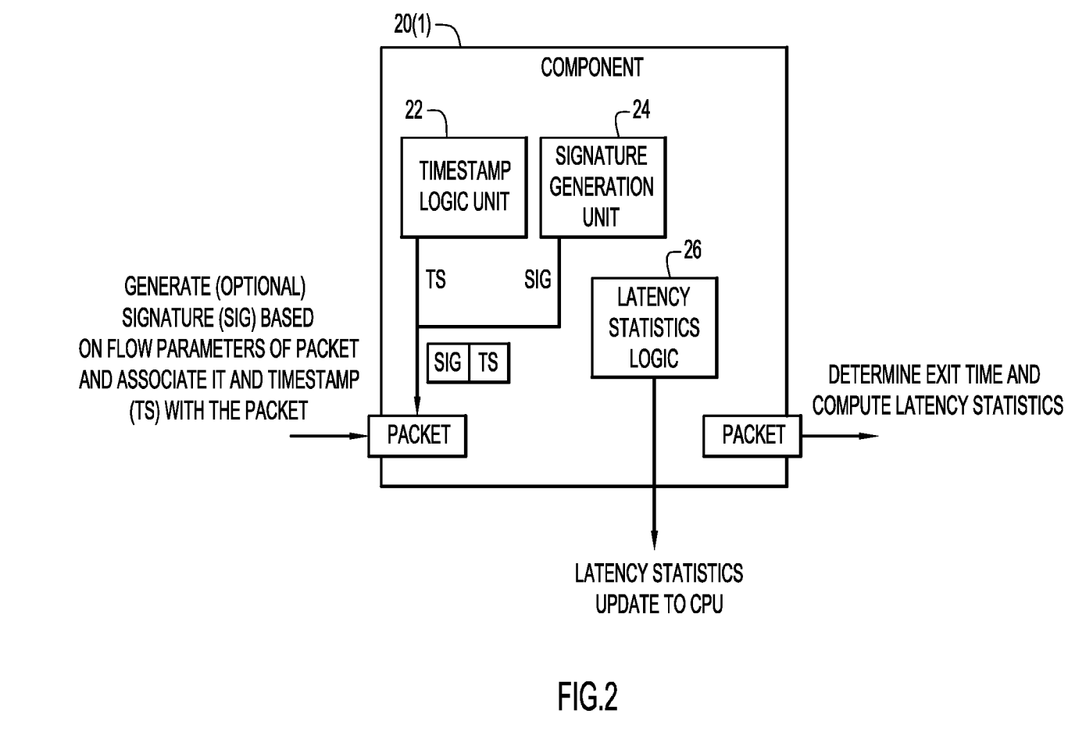
FIG. 2 is a more detailed block diagram of a component of a network device.

Reference is now made to FIG. 2 for a more detailed description of the operation of the timestamp logic unit 22 and signature generation unit 24. FIG. 2 shows a packet entering the component 20(1). A TS can be generated at any start point within the network device 10, where the packet is triggered. For example, if the component 20(1) is a port of the network device, the port parses and recognizes an incoming packet, based on a start of frame, end of frame or detection of a certain number of bytes (e.g., "byte count") of the packet. Upon detecting such an event, the timestamp logic unit 22 generates a TS with respect to the system clock. Thus, the TS represents the time of arrival of the packet at a particular point in the network device 10. The signature generation unit 24 generates a SIG for the packet based on one or more flow parameters of the packet, including media access control (MAC) source address (SA), MAC destination address (DA), Internet Protocol (IP) SA, IP DA, packet priority, etc. More generally, the signature generation unit 24 may generate the SIG based on one or more of: Layer 2 parameters, Layer 3 parameters, Layer 4 parameters, any programmable (user defined) bytes in the payload, packet priority parameters, lookup of one or more packet fields in one or more tables and user defined parameters. An example of a user defined parameter is a "logical interface" that can be derived from mapping tables based on the parameters of a virtual local area network (VLAN) and input port. The SIG may be generated based on a hash or other mathematical computation performed on one or more of the parameters referred to above. The SIG is an optional feature and is not required to be associated with a packet. Thus, there are applications in which only a TS is associated with a packet. When a SIG is generated, it serves as a key or guide to update statistics for a latency statistics group as explained further hereinafter.

More specifically, the signature is an indirection generated from flow parameters from the packet, source port information, etc., through various lookups in mapping tables, for example. The resulting signature encodes information from these various sources. The signature may be variable in length and in certain cases, it can be mapped to carry the "raw" source information and in other cases, it can be an encoded (or "compressed") data field or fields for a mask and certain bits of the signature used to match to determine which statistics group to update. Thus, the signature is redundant with the flow parameters, source port, destination port, VLAN and other information since the source of information is the same, but the difference is that certain information can be carried raw or encoded (either explicitly or overloaded through the signature) and used to determine whether or not to accumulate statistics. Thus, said another way, the signature for a packet contains or encodes one or more of: Layer 2 parameters, Layer 3 parameters, Layer 4 parameters, packet priority parameters, bytes in a payload of a packet, source port, destination port, and user defined parameters.

The TS (and optional SIG) generated for the packet are associated with the packet. In one example, the TS (and optional SIG) is associated with the packet by being inserted into the packet itself, e.g., in a header or other portion of the packet. This is referred to as in-band associating of the TS (and optional SIG) with the packet since they are contained within the packet itself. In another example, the TS (and SIG) is associated with an entry in a queue of the network device for the packet, and not within the packet itself. In latter example, the TS (and SIG) is said to be contained in side-band information for the packet. The queue in which the TS (and SIG) is stored may be in any one of the components 20(1)-20(M) shown in FIG. 1.

When the TS (and SIG) is associated with a packet as side-band information, the side-band information stays associated with the packet as the packet is processed by and passed through other components within the network device, so that the side-band information may be understood as a "wrapper" or "metadata" associated with the packet.

Still referring to FIG. 2, the latency statistics logic 26 detects a packet on exit from the component, determines an exit time (with respect to the system clock) and generates a latency measurement for the packet (within that component). Each component will perform such latency measurements, and the CPU 30 of the network device (FIG. 1) will receive an overall indication of latency of the network device at any given time.

Latency may be measured between any two points in the network device 10, but a most common use is to determine latency from an ingress port (start of frame) arrival to an egress port (start of frame), on a first bit in first bit out (FIFO) basis of a packet. It is also possible that latency may be measured between any two points in other ways, such as first bit in, last bit out (FILO), last bit in, first bit out (LIFO), and last bit in, last bit out (LILO), or any combination of FIFO, FILO, LIFO and LILO.

Figure 3:
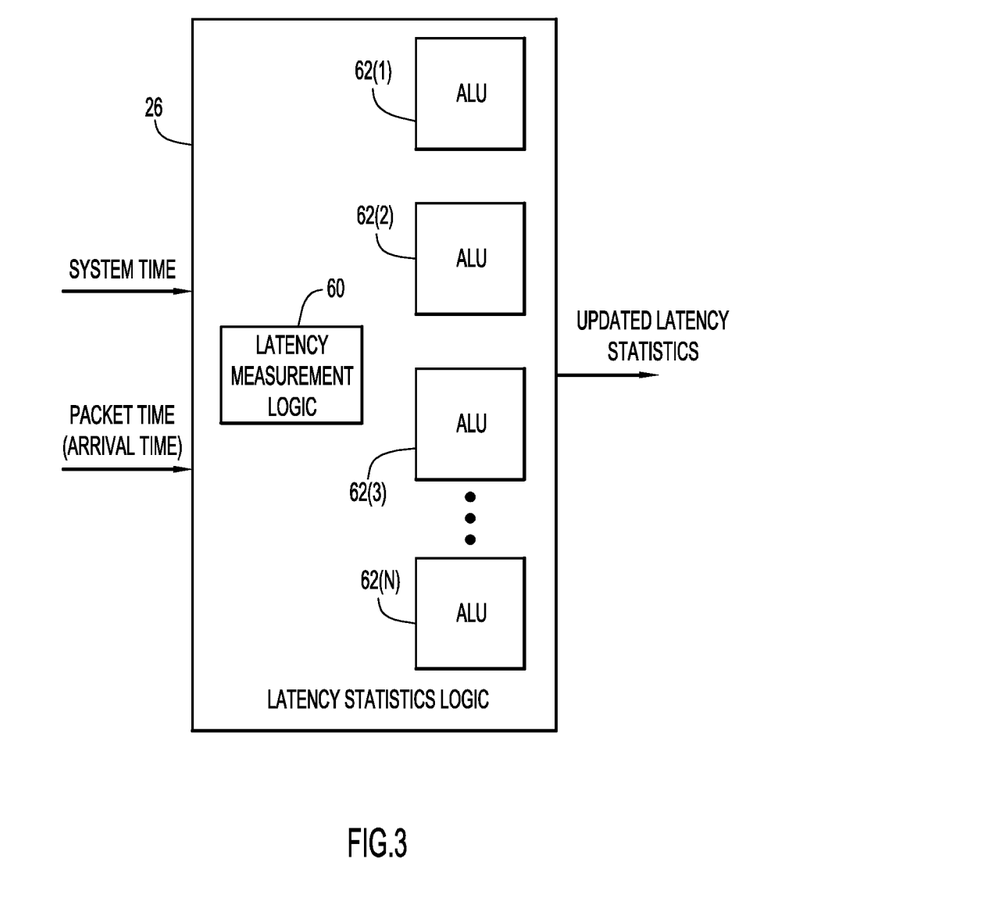
FIG. 3 is a detailed block diagram of latency statistics logic that is configured to compute updated latency statistics for packets that traverse through a component of the network device.

Turning now to FIG. 3, a more detailed diagram is shown for the latency statistics logic 26. The latency statistics logic 26 comprises digital logic for latency measurement logic 60 that computes a latency for a packet, such as (1) based on current time minus arrival time (relative to the system clock and without use of the TS in the packet), i.e., pkt.latency=current time−arrival time, and also a latency based on (2) the TS in the packet and current time, i.e., pkt.ts_latency=current time−pkt.ts.timestamp.

In addition, the latency statistics logic 26 includes one or more arithmetic logic units (ALUs) 62(1)-62(N), each of which can be configured to perform any of a variety of arithmetic operations based on the output of the latency measurement logic 60. Examples of arithmetic operations include average, maximum (MAX), minimum (MIN), standard deviation (STD), as well as range (i.e., within a predetermined/programmable value range), greater than a threshold, less than a threshold, equal to a predetermined value, or any other form of mathematical comparison. An ALU that generates a MAX statistic may do so according to the operation MAX=max(latency, MAX), and similarly and ALU that generates a MIN statistics may do so according to the relationship MIN=min(latency, MIN). Other examples of statistics that the ALUs 62(1)-62(N) may compute include total latency to this point in the network device, i.e. Running Total Latency=Running Total Latency+latency (i.e., a running accumulation of latency up to a component in the network device), and Running Total Variance=Running Total Variance+(latency*latency). Standard deviation can be calculated from 1/M*(Latency_Squared (Total_Latency* Total_Latency)), where Latency_Squared and Total_Latency are computed from the same consistent set of M packets; this information is read out and examined automatically. A running total packet count can be dedicated per any latency statistic or shared across all latency statistics (i.e., maximum latency, minimum latency, running total latency (for calculating average over some interval), running total latency squared (for calculating standard deviation, i.e., variance over some interval.).

The CPU 30 in the network device 10 may define a latency statistic group for particular flow parameter criteria in order to update one or more latency statistics for the latency statistic group based on packets that satisfy the particular flow parameter criteria. Latency statistics groups can be available for updating, and directly associated with egress ports and/or directly associated with egress queues of egress ports. Generally, all latency statistics within a statistics group are updated, particularly for implementations which share running total packet count. However, not all statistics groups have to be updated and in some cases none are updated. The CPU 30 may configure the hardware logic in each component to detect packets at another point in the network device based on the signature associated with the packets to compute, update and report latency statistics on packets that satisfy particular flow parameter criteria for a latency statistic group. The signature of a packet is used for filtering of packets for which updates for a latency statistic group are to be computed. The filtering may be on a "whitelist" or "filter-in" basis in which one or more latency statistics are accumulated for packets that match any combination of one or more of: a flow parameter, a source port, and a destination port. Alternatively, the filtering of latency statistics for a latency statistic group may be on a "blacklist" or "filter-out" basis in which one or more latency statistics for the latency statistic group involves excluding latency statistics for packets that match any combination of one or more of: a flow parameter, a source port, and a destination port.

The filter-in/out mechanism may be provided through generalized Ternary Content Addressable Memory (TCAM) lookup on packet fields (flow criteria), source port and destination port information to narrow or broaden which latency values are merged into a latency statistic group/category and to select latency group(s)/categories to update. Equivalently, a TCAM entry (Access Control List (ACL)) may be used to determine whether or not to timestamp a packet. Filtering examples include, but are not limited to, (a) latency measurements between certain port pairs, (b) excluding control plane traffic, (c) filtering traffic across all queues for a given egress port, (d) filtering only multicast traffic, etc. The CPU 30 configures the latency statistic groupings based on software configuration, e.g., under commands/instructions from network management appliance 50 (FIG. 1).

Generally, there can be multiple groups/categories, but implementations can be more specific, such as aggregate only on a per queue, per egress port basis and/or per egress port basis.

Access to latency statistic groups (bucket categories) may be such that the values are re-initialized on read. Access can be exported (e.g., through a push mechanism) or recorded and polled. Information can be aggregated in the form of: (a) histograms, (b) as raw data records with additional timestamps to record when the measurements were read, (c) alerts with timestamps, etc. External equipment loggers (e.g., network management appliance 50 shown in FIG. 1) may keep the last N bytes/packets running history and can use these as requests to lock and request additional possibly shared standby resources for storage/processing power.

The CPU 30 may be configured to generate alerts when a threshold is crossed with respect to one or more latency statistics reported by any one or more of the components in the network device 10. For example, if the MAX latency statistic exceeds a predetermined threshold for any given component in the network device, an alert is generated to the network management appliance 50. Similarly, if the running total latency in the network device is exceeded, an alert is generated to the network management appliance 50.

Figure 4:
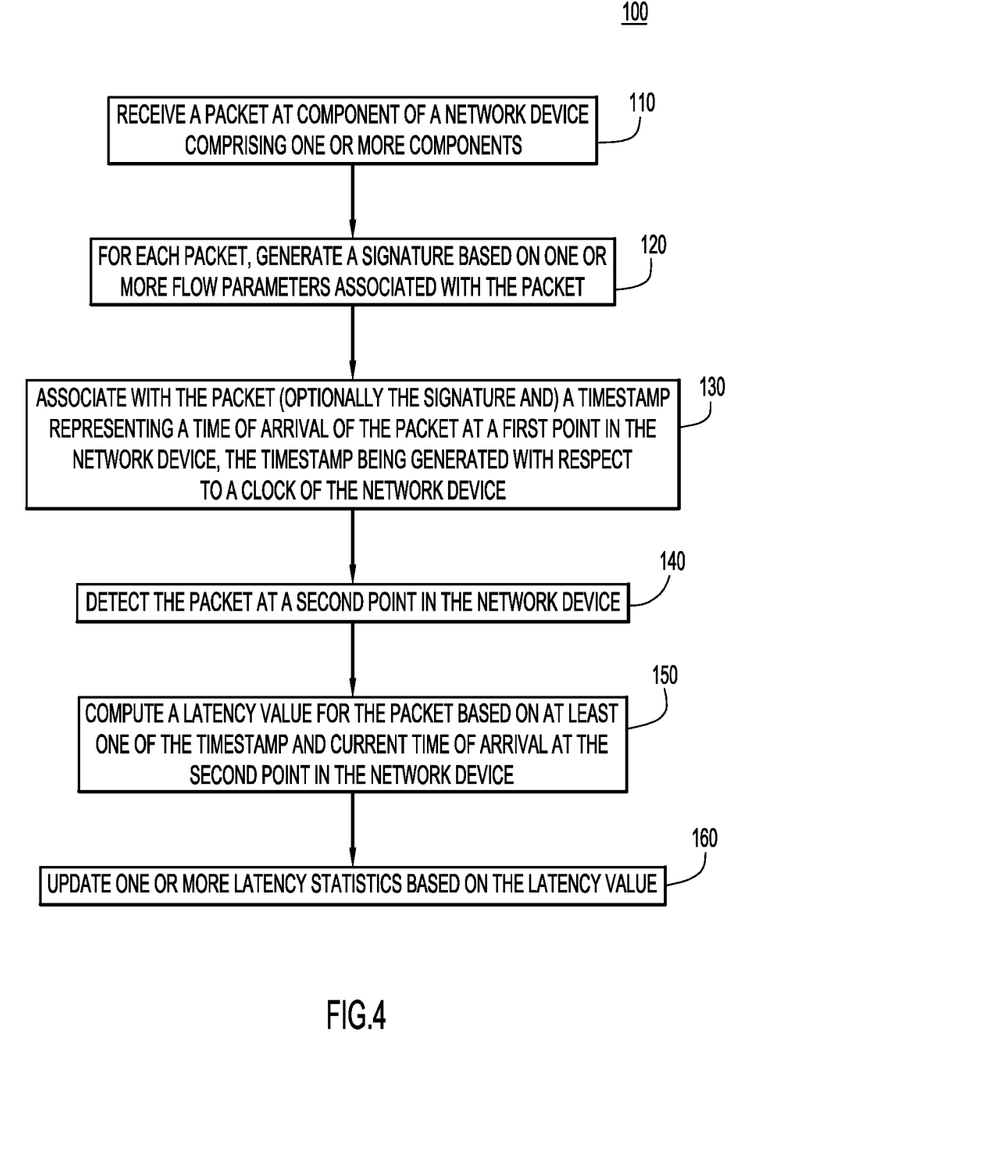
FIG. 4 is a flow chart that depicts overall operational flow of the latency measurements made on packets as they traverse through components of the network device.

Turning now to FIG. 4, a flow chart is provided depicting an overall operational flow 100 in a network device according to the techniques presented herein. Reference is also made to FIGS. 1 and 2 for purposes of this description. At 110, a packet is received at a component of a network device that comprises one or more components. At 120, a signature is generated for the packet based on one or more flow parameters associated with the packet. At 130, the signature and a timestamp representing a time of arrival of the packet at a first point in the network device are associated with the packet. As explained above, the generation and association of a signature with a packet is optional, and in some forms, only the timestamp is associated with the packet. The first point may be an ingress point to a component of a network device (e.g., the overall ingress point to the network device itself). The timestamp is generated with respect to a clock of the network device (that is common to all components of the network device). At 140, the packet is detected at a second point in the network. This second point may be at an egress point of the same component as the first point referred to above, or any other point in the network device of any component in the network device. At 150, a latency (measurement) value is computed for the packet based on at least one of the timestamp associated with the packet and current time of arrival at the second point in the network device. At 160, one or more latency statistics are updated based on the latency value computed at 150. This process repeats for other packets that pass through the network device, and latency statistics can be grouped together for packets associated with user defined flow and other criteria, as explained above. The one or more latency statistics may be collected at a processor unit (e.g., the CPU 30) from each of the one or more components of the network device. The CPU 30 may output the one or more latency statistics to a network management appliance 50. Furthermore, as explained above, the CPU 30 may generate an alert when one or more of the latency statistics satisfies one or more criteria, e.g., exceeds a predetermined threshold, etc.

The latency information is useful to determine network statistics, and external equipment may analyze the latency information. For example, when the latency of a particular packet group (e.g., packets associated with emails sent over the Internet) exceeds a predetermined latency value, that may result in a latency violation that triggers an alert to be sent to the user, whereby packet latency history information is logged for later analysis to determine the cause of the packet latency for this packet group.

When the alert is issued, the system may be configured to store the last M packets that resulted in the packet latency violation, such as the last 100 or the last 1000 packets, or by storing all packets within the last N milliseconds, the last N microseconds or the last N nanoseconds prior to when the latency alert issued. A buffer may be utilized to store this data, as a running packet history, which can be analyzed to determine the reason why a packet latency violation occurred. That is, the buffer stores information regarding the packets (of a particular packet category or all packet categories) that were within the network device when the packet latency increased dramatically within the networking device, whereby that information can be for later analysis to determine why this packet latency increase occurred. By way of example, a buffer that has the capacity to store data corresponding to packet latency information for 1000 packets can be used to store the packet latency information for a particular packet latency violation.

When no packet latency violation occurs, then the running packet history in the buffer is flushed (either entirely, or on a first in, first out basis), to allow for data from more recent packets to be input to the buffer. However, when a packet latency violation occurs, then the packet history currently stored in the buffer is saved to a non-volatile memory, for later analysis to determine the cause of the violation. If the packet latency violation was only at a particular egress port, then steps can be taken to remove that violation, such as by automatically routing incoming packets arriving at ingress ports of a network device to other egress ports that do not have a packet latency violation. Alternatively, the particular egress port may be temporarily given a higher priority with respect to packet outflow from the network device as compared to other egress ports, to try to overcome the packet latency violation.

The techniques presented herein provide for a very flexible latency measurement that is capable of tracking latency through a switch, a port, a queue, or even finer granularity for flexible troubleshooting.

Figure 5:
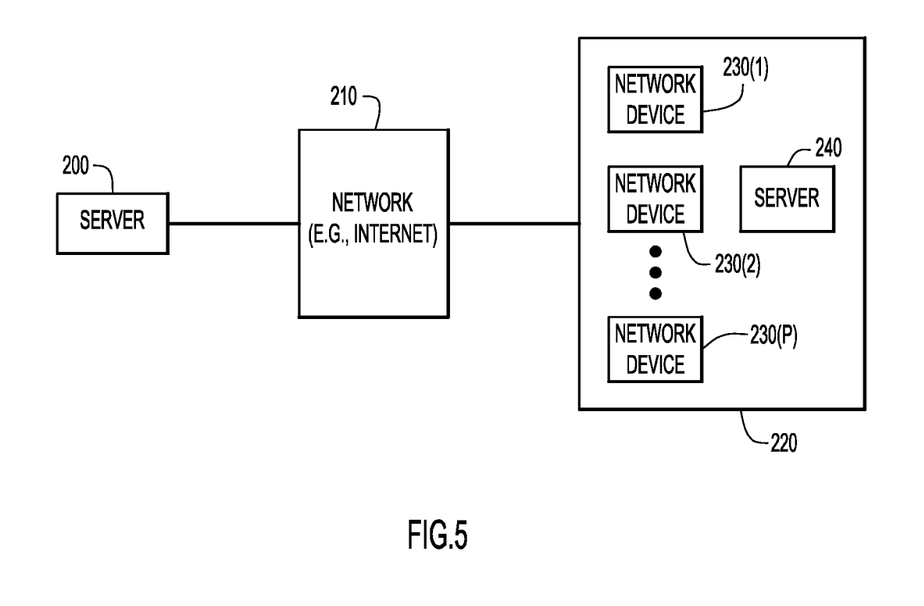
FIG. 5 is an example system diagram illustrating one application for use of the network devices configured as depicted in FIGS. 1-4.

Reference is now made to FIG. 5 for a description of an example application of a suitable configured network device as described above in connection with FIGS. 1-4. FIG. 5 shows a server 200 connected to a network 210, e.g., the Internet. A data center 220 is also connected to the network 210 and receives communications from the server 200. The data center 220 includes a plurality of network devices 230(1)-230(P) and one or more servers. A single server 240 is shown for simplicity. The server 200 may sent a transaction request over network 210 to data center 220. The transaction request traverses through one or more of the network devices 230(1)-230(P) before reaching the server 240 for processing. Each of the network devices 230(1)-230(P) is equipped according to the concepts presented above in FIGS. 1-4 to enable high precision latency measurement reporting through each component of each network device. This is particularly important in latency-sensitive applications served by the server 240.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description is intended by way of example only.

What is claimed is:

1. A method comprising:
receiving a packet at a component of a network device that includes a plurality of components;
at each of the plurality of the components:
generating a signature based on one or more flow parameters associated with the packet;
associating with the packet the signature;
associating with the packet a timestamp representing a time of arrival of the packet at a respective one of the plurality of the components in the network device;
detecting the packet at an exit of the respective one of the plurality of the components in the network device based on the signature;
performing the associating with the packet the timestamp and the detecting for each of the plurality of the components in the network device; and
computing latency measurements for the packet at the plurality of the components in the network device.

2. The method of claim 1, further comprising filtering the latency measurements for the plurality of the components in the network device to output latency measurements of one or more specified components in the network device.

3. The method of claim 2, wherein the one or more specified components in the network device are ports of the network device.

4. The method of claim 1, wherein computing latency measurements comprises computing different latency measurements for the plurality of the components in the network device.

5. The method of claim 4, wherein the different latency measurements include: first bit in first bit out (FIFO) basis of the packet, first bit in, last bit out (FILO) basis of the packet, last bit in, first bit out (LIFO) basis of the packet, and last bit in, last bit out (LILO) basis of the packet, or any combination of FIFO, FILO, LIFO and LILO.

6. The method of claim 4, wherein the different latency measurements are made with respect to different clock sources of different precision.

7. The method of claim 1, further comprising inserting the timestamp into the packet.

8. The method of claim 1, further comprising outputting the latency measurements for the packet from the network device to a network management appliance.

9. A network device comprising:
a plurality of components to process packets as the packets pass through the network device, the components being synchronized to a common time reference, each of the plurality of components including:
a timestamp logic unit configured to generate a timestamp upon arrival of a packet at a respective component for association with the packet;
a signature generation unit configured to generate a signature based on one or more flow parameters associated with the packet, and to associate the signature with the packet; and
a latency statistic logic unit configured to detect departure of the packet from the respective component based on the signature and generate a latency measurement for the packet based on the arrival and departure of the packet; and a processor coupled to the latency statistic logic unit for each of the plurality of the components, wherein the processor computes latency measurements for the packet at the plurality of the components in the network device based on the latency measurements received from the latency statistic logic unit of each of the plurality of the components.

10. The network device of claim 9, wherein the processor is further configured to filter latency measurements for the plurality of the components in the network device to output latency measurements of one or more specified components in the network device.

11. The network device of claim 10, wherein the one or more specified components in the network device are ports of the network device.

12. The network device of claim 9, wherein the processor is configured to compute different latency measurements for the plurality of the components in the network device.

13. The network device of claim 12, wherein the different latency measurements include: first bit in first bit out (FIFO) basis of the packet, first bit in, last bit out (FILO) basis of the packet, last bit in, first bit out (LIFO) basis of the packet, and last bit in, last bit out (LILO) basis of the packet, or any combination of FIFO, FILO, LIFO and LILO.

14. The network device of claim 12, wherein the processor generates the different latency measurements with respect to different clock sources of different precision.

15. A non-transitory computer readable tangible storage media encoded with instructions that, when executed by one or more processors of a plurality of components of a network device, cause the one or more processors to:

at each of the plurality of the components:

generate a signature based on one or more flow parameters associated with a received packet at a respective one of the plurality of the components;

associate with the packet the signature;

associate with the packet a timestamp representing a time of arrival of the packet at the respective one of the plurality of the components in the network device; and detect the packet at an exit of the respective one of the plurality of the components in the network device based on the signature; and compute latency measurements for the packet at the plurality of the components in the network device.

16. The non-transitory computer readable tangible storage media of claim 15, wherein the instructions further cause the one or more processors to filter the latency measurements for the plurality of the components in the network device to output latency measurements of one or more specified components in the network device.

17. The non-transitory computer readable tangible storage media of claim 16, wherein the one or more specified components in the network device are ports of the network device.

18. The non-transitory computer readable tangible storage media of claim 16, wherein the instructions cause the one or more processors to compute different latency measurements for the plurality of the components in the network device.

19. The network device of claim 9, wherein the timestamp logic unit is configured to insert the timestamp into the packet.

20. The network device of claim 9, wherein the processor is configured to output the latency measurements for the packet from the network device to a network management appliance.

* * * * *